Dec. 17, 1963  R. E. ANDERSON  3,114,900
AUTOMATIC INCREMENTAL METERING
Filed Dec. 8, 1960  5 Sheets-Sheet 1

Inventor,
Roy E. Anderson,
by Francis K. Doyle
His Attorney.

United States Patent Office 3,114,900
Patented Dec. 17, 1963

3,114,900
AUTOMATIC INCREMENTAL METERING
Roy E. Anderson, Schenectady, N.Y., assignor to General Electric Company, a corporation of New York
Filed Dec. 8, 1960, Ser. No. 74,522
20 Claims. (Cl. 340—182)

The present invention relates to improvements in metering, and, in one particular aspect, to automatic selective processing of distinctively-coded measurement data reported by utility meters upon each passage of a predetermined incremental amount of supply from service mains to a consumer load.

In the utilities industries, traditional practices for the billing of consumers have involved laborious calculations based upon reports by visiting meter readers, each increment of the consumption totalized by each household meter being assessed at a uniform step rate, and the meter readings themselves being taken at infrequent intervals of a month or more. The labor costs incident to such readings and to the related human processing of this data are inescapable burdens which both the producer and consumer have been obliged to accept in the absence of more economical alternatives of equal reliability. Moreover, it is commonly the case that different increments of the production and consumption are of significantly different economic value, such that those who consume under prevailing conditions most favorable to the supplier must nevertheless bear a disproportionately large share of the total cost when the step rates for all uses are uniform. These have been the circumstances in the electric power industry, for example, where generating and distributing equipment may function most efficiently under prescribed loading conditions and it should therefore be economically attractive for both the utility and consumers that the consumption be increased when it falls below such loading and that it be curtailed, or at least assessed at rates equitably offsetting the increased costs, when the optimum loading is exceeded. To some extent, the latter goal has been approached through the introduction of demand meters, such as those which register maximum kilowatthour demand by the consumer during the measurement interval, the restrictions to or excesses over prescribed limits providing the basis for appropriately lower and higher charges. For like reasons, it has now also become the practice to activate household electric water heaters automatically, such that their loads will be absorbed under optimum economic conditions. In any event, the costs, labors and errors of human readers are not eliminated, and the simple totalized meter registrations are devoid of information as to the consumer's demand at any given instant. Information of the latter type is important, however, not only for the billing purposes mentioned but also for the utility's purposes in planning to cope with widely varying instantaneous demand in the most effective and economical manner.

Prior proposals for automatic reading of motors have generally been concerned with simple telemetering of totalized meter registrations at the consumer's site to a central station, whereby the need for human readers could be obviated. For example, it has been proposed that the central station may include a meter corresponding to each consumer meter and registering the same data, and, alternatively, that the totalizing register dial mechanisms of the consumer meters be scanned and reproduced sequentially at the central station over selective lines such as the consumers' telephone lines. However, the complexities and costs of such known forms of installations tend to be greater than would be warranted merely by replacement of human readers. By way of distinction, the present invention further develops data which accurately characterizes the consumer demand at any time, thereby contributing important intelligence for use in programming of operations by the utility and for automatic billing computations based upon complex rate structures. These important advantages are realized through use of meters which are each uniquely constructed to report automatically to a remote data-storage center a distinctive electrically-coded indication each successive time its integrations have reached a small critical predetermined amount. The reporting to the storage center from all of the associated meters arrives at random, rather than in any predetermined sequence, thereby avoiding need for selective or sequential sampling equipment. Long-term integrations of the consumptions of each load are performed remotely from the meter sites, such that the individual meters require no totalizing register mechanisms, and such that demand information is always available at a remote reading center.

Accordingly, it is an object of the present invention to provide novel and improved automatic metering involving random reporting of successive increments of the supply to consumer loads for remote storage and data-handling purposes.

Another object is to provide an improved automatic reading and billing system for an electrical power network in which each of the meters at a plurality of consumer locations is self-actuated to report to a remote storage center the passage of each successive increment of energy to its load and in which the remotely-stored data accurately characterizes consumer demand on a substantially continuous basis, the system being adapted to manufacture, installation and operation at relatively low cost.

A further object is to provide an automatic reading and billing system for an electrical power network wherein each consumer watthour meter installation is self-actuated to develop a distinctive binary-coded output indication of passage of each successive increment of energy to its associated load.

It is a still further object to provide improved automatic metering apparatus for an electrical power network wherein each of a multitude of watthour meter installations spontaneously develops distinctively-coded output signals indicating the deliveries of successive increments of energy to its load and wherein the coded output signals occurring at random are sorted and stored for data-handling purposes in random access memory circuitry which is periodically read out within predetermined critical intervals.

By way of a summary account of practice of this invention in one of its aspects, each of a group of electrical watthour meter installations at neighboring consumer sites includes an induction watthour meter motor unit actuating a unique electrical signalling stage powered from the service mains. The conventional pivoted conductive disk of each meter motor unit is effective to close a switch in the signalling stage temporarily each time the disk rotates through a predetermined angle which characterizes the flow of about 200 watthours of energy to the associated load. In turn, each switch closure initiates the generation of a coded signal, such as a binary-coded burst of pulses, which is distinctive of that one of the meter installations in the group. In one preferred embodiment, the burst of pulses is generated by a multi-contact mercury switch which is rotated by a thermal torque generator energized by the service mains through the disk-actuated switch. The coded signals occurring at random times from the group of meter installations are transmitted over a common communication link, in the form of a wired line, to a remote repeater from which the coded signals are further coded and transmitted at higher speed to a reading center which also receives the doubly-coded signals from other repeaters associated with other similar groups of meter installations. At the remote reading center, the received doubly-coded random signals are sorted and stored in a random access memory array which is capable of storing the binary bit information that any or all of the meter installations have used one increment of energy. The records of stored information are periodically extracted from the memory array, in a predetermined known sequence however, at intervals less than that during which more than one output signal can be developed by any one meter installation. Binary codings of data read out of the random access memory at these intervals are totalized to provide demand readings for a suitable longer interval, such as an hour. A further magnetic storage is then made of the demand readings, identified as to the related meters and applicable rates, and computations are made automatically for billing purposes from such stored information at the end of the monthly billing period.

Although the features of this invention which are believed to be novel are set forth in the appended claims, the details of preferred embodiments and practices of the invention, and the further objects and advantages thereof, may be most readily comprehended through reference to the following description taken in connection with the accompanying drawings, wherein:

Figures 1, 2, 3:
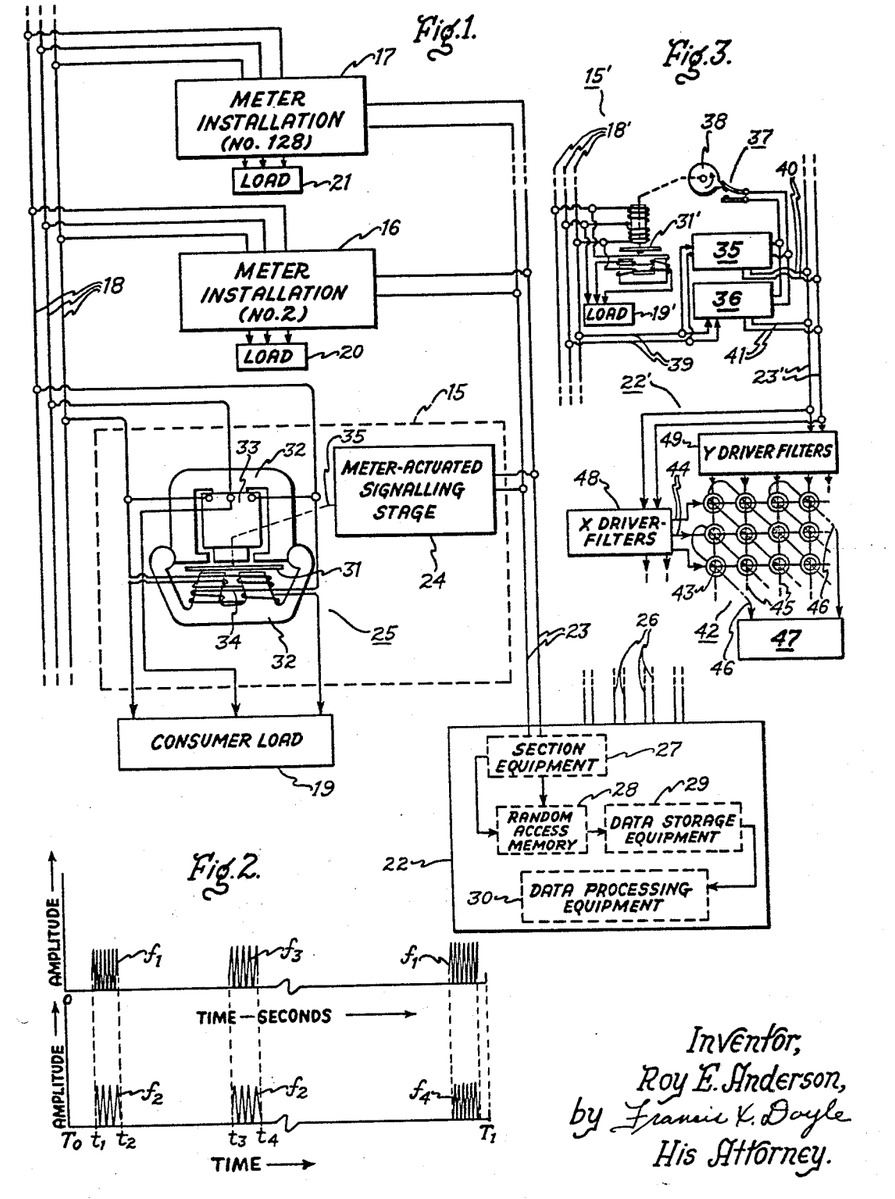
FIGURE 1 portrays automatic meter reading and computation equipment for an electric power distribution system in which the present invention is practiced, the illustrations being partly in schematic and partly in block form.
FIGURE 2 presents two related sets of output signals from meter installations which distinctively code the uses of predetermined increments of energy by consumer loads such as those of the system shown in FIGURE 1.
FIGURE 3 is partly schematic and partly block-diagrammed illustration of a portion of an automatic meter reading system wherein the coding is as represented in FIGURE 2.

The equipment depicted in FIGURE 1 is designed for use with a number of electrical distribution sections each including a maximum of one hundred and twenty-eight consumer electric meter installations, of which those represented by reference characters 15, 16 and 17 represent the first, second and last of one such section. Three-wire service lines, 18, make the customary 240-volt, 200-ampere, single phase power available to the respective consumer loads 19, 20 and 21 through these meter installations. As will become apparent from descriptions following later herein, the section of one hundred and twenty-eight, or another suitable number, of meter installations represent groupings which are advantageous for automatic meter reading purposes, although the power-service lines themselves may be independent of such grouping and may be connected with the loads and meter installations according to any desired program. While the prior practice has been for readers to visit each household location and to record the visible integrated registrations of power consumptions during the interval since the last such visit, this is entirely avoided in the FIGURE 1 equipment by automatic electric reporting of measurement conditions at each meter to memory and computation equipment in a reading center 22 which is at a remote location such as a utility company office where customer demand and billing information is ordinarily processed. For these purposes, signalling stages of all meter installations in any section are coupled with the reading center by a common two-wire line 23. The signalling stages, such as that designated by reference character 24, each automatically releases a short distinctive electrically-coded signal every time the associated meter unit, such as unit 25, integrates the consumption of each successive predetermined small increment of electrical energy by the associated consumer load. By virtue of this automatic reporting, the information transmitted from various ones of the meter installations arrives at the reading center at unpredictable times, since it cannot be established when any particular consumer load may chance to complete its consumption of the predetermined small increment of power since the last such event. However, the reported information does posses a distinctive coding which permits positive identification of the meter transmitting it, and, further, the statistical probability that more than one such meter will report at the same time over the common line is rendered extremely remote because of the short time interval selected for the reporting and because of the limited number of meters in the section. Moreover, the predetermined increment of energy designated by each coded report is so small as to render the errors of simultaneous reporting negligible.

A plurality of such sections deliver incremental energy data to the one reading center 22, by way of the further section lines 26. Section equipment 27 translates the incoming coded random signals from each section into form suitable for reading into a random access memory, 28, which is preferably of the known magnetic core matrix type. There, the randomly-occurring coded signals which arrive during a predetermined short time interval produce distinctive magnetic storage in cores corresponding to the respective meter installations which made reports, and at the end of that interval the stored information is swiftly read out of the cores, sequentially, and the retrieved data is then applied to data storage equipment 29. In the sequential read-out process, the occurrence of an output signal at any particular time therefore signifies that a particular meter has reported the completed consumption of a predetermined increment of energy by its load during the predetermined short time interval. Data processing equipment 30 receives data from storage equipment 29 and computes the consumer demand on a substantially continuous basis, as well as providing computations of customer billing for a relatively long period, such as a month, according to a predetermined rate structure. Because the read-out process must consume a finite period, during which meter reports may be delivered to the reading center even though the period is very short, the random access memory 28 preferably includes an auxiliary memory matrix into which incoming data may be read while an alternate core matrix is being read out, thereby further minimizing the susceptibilities to error.

A 200-watthour increment of power is one which will afford satisfactory resolution of data, i.e. the data is considered accurate enough if it is within 200 watthours of the exact amount. Based upon the selection of this predetermined increment of energy for the meter reporting, the corresponding short time interval for reading data into a core matrix of the random access memory before the sequential read-out to the storage equipment is then 15 seconds. Fifteen seconds thus represents the shortest period within which the consumer load associated with any meter installation could draw 200 watthours of energy, calculated as follows:

$$\frac{200 \text{ watthours} \times 3600 \text{ seconds/hour}}{240 \text{ volts} \times 200 \text{ amperes}} = 15 \text{ seconds}$$

Therefore, with the signalling stages actuated to release brief bursts of distinctively-coded signals each time their associated meter units integrate the flow of 200 watt-hours of energy, it is assured that no meter installation can report more than once in any fifteen-second interval. Each random access memory matrix which stores the reports made during any such interval is then read out and readied anew for memorizing during a subsequent interval, so that no two or more successive reports from one meter installation can be erroneously characterized as but a single report. The small successive integrations which must be performed by the meter unit 25, and its counterparts, are conveniently achieved by the common induction meter motor construction including the usual rotatable conductive disk 31, magnetic frame assembly 32, and potential and current windings 33 and 34, the output shaft 35 being caused to turn fully through a predetermined angle each time 200 watt-hours of electrical energy is consumed. While the customary register may also be connected with the disk output shaft, for visual checking or in cases where existing meters are converted for practice of the present invention, that is not essential. A cam-actuated switch or the like in the signalling stage 24 may serve to trigger the needed release of coded electrical output signals, in ways detailed later herein.

In one practice, the required meter coding is established by two simultaneous short pulses or bursts of output signals on different frequencies generated within each meter-actuated signalling stage. This is characterized by the waveforms of FIGURE 2, wherein the simultaneous bursts on frequencies $f_1$ and $f_2$ between times $t_1$ and $t_2$ represent the coded output of an installation such as meter installation 15 in FIGURE 1 during a given time interval $T_0$ to $T_1$. Another different pair of frequency bursts, $f_2$ and $f_3$, between times $t_3$ and $t_4$ identifies the report by another installation, such as 16, later during the same period, and so on, despite the fact that more than one report involves a frequency common to another. According to such programming, twenty different frequencies suffice to identify distinctively one hundred different meter installations, for example. As is shown in FIGURE 3, a meter installation 15' serving consumer load 19' from service mains 18' may conveniently include two known forms of transistor oscillators 35 and 36 which produce simultaneous output pulses on different frequencies in response to triggering by an impulse switch 37. Momentary inertia-induced contacting between the spring blades of switch 37 as one of them is dropped by cam 38 causes the desired triggering of the oscillators each time the cam is rotated fully through a predetermined angle by the conductive disk 31' of the integrating induction meter motor unit. Oscillators 35 and 36 are energized by the service mains through line 39 and release their outputs to the section line 23' by way of output lines 40 and 41, respectively. At the associated reading center, 22', the pulses are selected according to frequency and are applied to a random access memory device which is shown in the form of a magnetic core matrix 42, although an equivalent storage tube or the like could also be substituted. In a manner well known in the art, any one of the cores 43 of the fragmentary illustration of the matrix may be switched to one saturation condition by coincident currents flowing in the two read-in wires passing through it from among the many X-grid wires 44 and Y-grid wires 45. And, the stored information in the various cores may then be read out destructively, in predetermined sequence, in a similar operation which involves applying currents through different grid wires to fix all cores in another saturation condition, the shifts in saturation being evidenced by output pulses in the common threaded output leads 46. Data storage and processing equipment 47 operates on the basis of the output information read out in such a manner. The X and Y drivers 48 and 49 respond to the meter installation outputs to excite appropriate ones of the grid wires in accordance with the frequencies of the received bursts, and for this purpose they include suitable filters. The circuitry for read-out excitations are not specifically illustrated, although this will be understood to be of a conventional type, and, while in the further interests of simplicity of illustration only a single memory matrix is shown, it should also be understood that an alternate matrix is preferably substituted for a reading-in (writing) while the written matrix is being read out.

Figure 4:
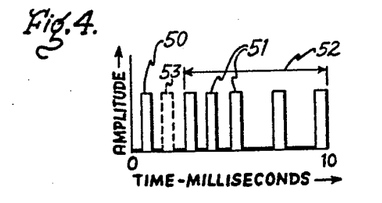
FIGURE 4 depicts graphically a coded pulse train output which is representative of those produced by another embodiment of meter installation for an automatic reading system.
Figure 5:
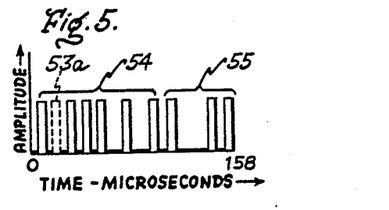
FIGURE 5 depicts graphically the coded pulse output of a high speed repeater in response to the pulse train of FIGURE 4.

A preferred practice, which is explained through reference to the pulse waveforms of FIGURES 4 and 5, involves a pulse meter coding which is of a binary character. It will be understood that the term binary as used throughout the specification and claims includes any type of known binary code, for example, a simple binary or a complex binary such as a decimal binary. For this purpose, each of the meter installation signalling stages in a section, such as stage 24 of FIGURE 1, develops a train of pulses in response to triggering by the associated meter unit each successive time the predetermined incremental amount of energy has been delivered to the load. The first pulse in each instance denotes the start of a message, and it is followed by a succession of pulses which serve to identify distinctively the particular meter installation making the automatic report. In FIGURE 4, the start pulse 50 is shown to be followed by five of seven possible like meter-identification pulses, 51, in the time interval 52. The distribution of the meter-identification pulses forms a binary number which, in the case of a seven-pulse code, makes possible the identification of the one hundred and twenty-eight meter installations in one section. According to binary coding techniques, each "bit" of information added to a message doubles the number of possible selections, the progression being one which increases by the power of two, such that the seven binary bits represented by the presence or absence of seven sequential pulses in the meter-identification code permits the total of one hundred and twenty-eight meters to be identified. A ten millisecond message length is found to be appropriate to suppress the statistical probability of error due to overlap of messages from different meter installations. However, a further safeguard is also introduced by insertion of a further pulse, designated by the dashed linework 53 in FIGURE 4, each time a meter installation reports each tenth successive increment (2 kilowatt hours) of energy, whereby the error probability is further reduced. This 2 kwh. pulse is then used to correct the total reading at the reading center to the nearest tenth multiple of the 200 watthour increments, if need be. As has been explained, the reading center serves a plurality of meter sections, which may involve up to thirty-two separate sections, and this in turn leads to a further identification of the section from which the messages originate and to a condensation of the total message length. A five-bit binary pulse code suffices to distinguish the messages from the thirty-two metering sections, and is therefore appended to the meter installation code as shown in FIGURE 5. There, the nine-bit pulse code 54 includes the start pulse, 2 kwh. pulse, and seven-bit identification code, followed by the five-bit section code 55. The 158 microsecond interval for this fourteen-bit message is achieved by multiplying the speed of the section message, one hundred times in the example of the message illustrated in generated and multiplied forms in FIGURES 4 and 5, respectively.

Figure 6:
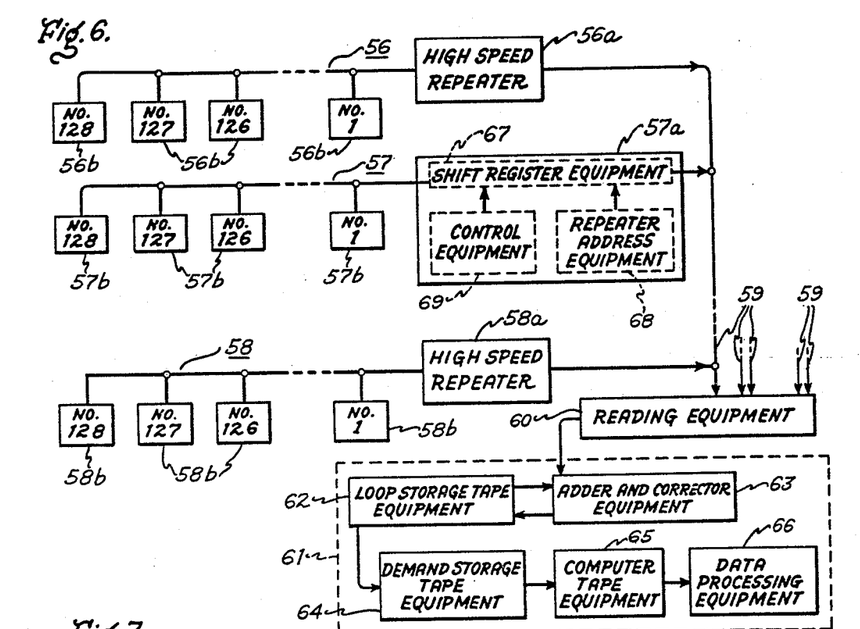
FIGURE 6 is a block diagram of an improved high-capacity meter reading system which involves high-speed repeating of coded signals from meter installations.

A system exploiting the binary pulse coding and high-speed multiplication concepts appears in FIGURE 6, wherein three of thirty-two possible metering sections each including up to one hundred and twenty-eight meter installations are designated by reference characters 56, 57 and 58 and are illustrated in their association with one of the fifteen possible section lines 59. Each of the fifteen section lines 59 thus has the capacity to accommodate 4,096 separate meter installations, and, as a whole, the particular system chosen for illustration therefore possesses a capacity fifteen times as great, i.e. 61,440 meter installations. The reading equipment 60, to which the coded information is transmitted for selective storage, may of course be made to accommodate any desired multiples of this basic system or block of sections, simply by duplicating the equipment needed for selective storage of the added blocks of sections, so that the utility can read automatically any desired number of meter installations in an area which it serves. Computation equipment 61 operates upon the selectively-stored data to provide outputs of information which characterize demand, for any interval of fifteen seconds or more which is of interest to the utility, and to compute customer billing for the usual longer periods, such as a month. The random access memory equipment in reading equipment 60 stores metered data only for the chosen fifteen-second interval already referred to, and it is necessary that the information extracted from the memory in predetermined sequence according to identifying meter numbers then be totalized for the demand interval selected. Such demand intervals may be of the order of 15, 30 and 60 minutes, for example. The needed storage for the demand interval may conveniently be performed through use of a magnetic medium such as a conventional continuous loop tape in loop storage tape equipment 62. For these purposes, the selectively-read metering data is applied directly to an adder which is part of adder and corrector equipment 63, and totalized data for each meter installation is accumulated for each read-out operation in reading equipment 60 in cooperation with the loop storage tape equipment 62. The adder receives not only the read-out incremental energy data for each meter installation but, simultaneously, the running total for the same installation as contained in the loop storage tape equipment for that fraction of the demand interval which has elapsed. If any meter installation reports the use of an increment of energy, this is added to the total which equipment 62 inserts into the adder, to produce a new total. If this new total should, but does not, amount to an integral multiple of ten such increments, as determined by the presence in the coded signal of a 2 kwh. pulse corresponding to pulse 53 in FIGURE 4 and 53a in FIGURE 5, the corrector portion of equipment 63 corrects the new total to the nearest multiple of ten increments. After the totalizing and correcting, if necessary, the new total is returned to loop tape storage equipment 62 for storage. This process is repeated each fifteen seconds until the full demand interval has elapsed, whereupon the demand information, in binary number form, is applied to demand storage tape equipment 64. Of course, if short-period demand information is not of interest, the loop storage tape alone can be permitted to totalize for a full billing interval, such as a month. And the short-period information can be used by the utility in supervising the economic distribution of power. However, for purposes of obtaining short-period demand data for billing processes, the loop storage tape equipment 62 is next cleared of its storage and readied for the totalizing storage during the succeeding short demand interval. The tape in demand storage tape equipment 64 thereby contains demand information recorded in binary number form, for all of the meter installations in sequence from the first to the last of a possible total of 61,440, together with a suitable identification of each installation. Each demand interval is thus represented by up to 61,440 demand readings on the demand tape, and this information can also be used by the utility in supervising the economic distribution of power to consumers at any time. Computer tape equipment 65 receives the demand readings for each of the 61,440 meter installations during each of the demand intervals (such as one hour) occurring within a longer billing period (such as 30 days), together with the distinctive rate information for each of these demand intervals. These two types of information are then used to control the processing of all consumer bills for the billing period, in data processing equipment 66.

Each of the section lines 59 may theoretically contain up to 4,096 separate reports of uses of the predetermined 200 watthour increment of power by the various consumer loads during the selected fifteen-second interval. And, as has been stated earlier herein, each of the sections, such as sections 56–58, on any line uses meter signalling stages producing meter identification codes having seven bits which characterize up to one hundred and twenty-eight meter installations. In turn, each of the signals from up to thirty-two sections on each line is distinguished by appending one of thirty-two possible five-bit pulse codes, such as code 55 in FIGURE 5, to eliminate the ambiguity which could otherwise result from the like coded signals emanating from the different sections on one common output line. From the standpoints of economy, reliability and complexity of equipments involved, it may be preferred that the section pulse codes be separately appended, rather than that the meter installations each produce a more complex pulse code needed to distinguish it from all the others. And, the need to reduce statistical probability of overlap of messages dictates that the relatively slow-speed pulses from the meter installations in one section (which nevertheless have a low probability of overlap because of the relatively few meters in each section) be speeded up before being transmitted to the reading equipment over a common line with messages from other such sections. Both the needed further pulse coding of the section origins and the needed multiplication of speed are achieved in section repeater equipments, designated as high speed repeaters 56a, 57a, and 58a, respectively, in association with sections 56, 57 and 58 in FIGURE 6. Preferably, such repeaters may take the form illustrated in connection with repeater 57a, wherein shift register equipment 67 stores an incoming nine-bit message from a reporting meter installation in its section, 57, wherein repeater address equipment 68 develops and inserts the distinctive five-bit section code for that section, and wherein control equipment 69 causes the resulting fourteen-bit code to be read out to the appropriate line 59 at the desired multiplied speed, such as that compacting the full message into 158 microseconds as portrayed in FIGURE 5. Further details of one preferred high-speed repeater are described later herein in relation to the illustration in FIGURE 11.

Figure 7:
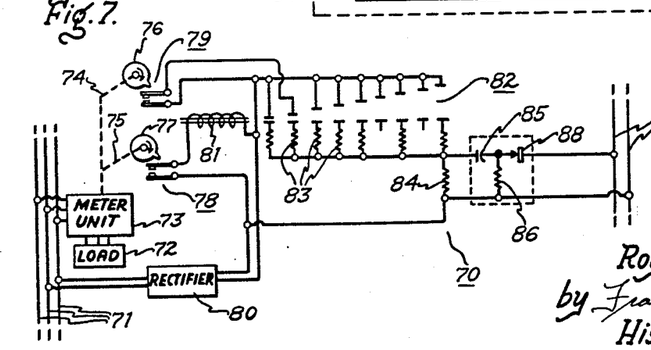
FIGURE 7 portrays one form of meter installations which produces a pulse-train coding of consumer uses of predetermined increments of energy, the illustrations being in block and schematic form.

A meter installation 70 which develops a nine-bit code of the form shown in FIGURE 4 is illustrated in FIGURE 7, and should be understood to represent an installation such as any one of those numbered 15–17 in FIGURE 1 or designated 56b, 57b and 58b in FIGURE 6. The electrical service mains 71 there excite a consumer load 72 through the meter unit 73 which may comprise an induction meter motor unit such as the aforedescribed unit 25, and the mechanical output movements of the meter unit's rotating disk shaft are coupled at 74 and 75 to two cams 76 and 77, respectively. Cam 77 is set to actuate an associated switch 78 to closure from a normally open condition each time the meter unit integrates the use of another 200 watthour increment of power by the load, while cam 76 is set to actuate its normally open switch 79 to closure each time the meter unit integrates another ten such increments, i.e. 2 kwh. Upon closure of the 200-watthour switch 78, direct current rectified from the service mains by rectifier 80 is caused to energize the winding 81 of a multi-contact relay including nine sets of normally-open contacts 82. These sets of contacts are shown to have different physical spacings which cause them to close in rapid sequence within a predetermined short interval, and selected sets of these contacts are connected in parallel across the rectifier output through separate resistances 83 and a common output resistance 84. As the sets of contacts close, viewed from left to right in FIGURE 7, the first develops a small flow of current through the output resistance 84 for the purpose of developing a start pulse; the second increases this current to a slightly higher level, provided the associated 2 kwh. switch 79 is closed for the purpose of developing a 2 kwh. pulse; the third, fourth and fifth increase the current by like steps; the sixth makes no change in the output current because its circuitry is intentionally left incomplete; the seventh increases the current by one further step; the eighth makes no change in the output current because its circuitry is also intentionally left incomplete; and the ninth increases the current by one more step. The resulting stepped direct current voltage occurring across resistance 84 is thus coded according to the connections of the sets of contacts, but it is not in the pulse form of FIGURE 4. However, the conversion from stepped to isolated pulse form is readily achieved by the differentiator circuitry including capacitance 85 and resistance 86, whereupon the output placed across section lines 87 is generally as depicted in FIGURE 4. Rectifier 88 blocks all but the positive pulses produced by the differentiator and thereby prevents the negative pulses developed upon switch openings from reaching section lines 87. Not more than one coded pulse train can be generated for each closure of switch 78, even though the switch is held closed thereafter. The closing of contacts one at a time and in rapid sequence can be performed in other ways also, as by action of a relay having a single movable armature sequentially shorting the nine sets of contacts. The contact wirings are of course made distinctive for each of the meter installations in each section, to create the distinctive pulse codings.

Figure 8:
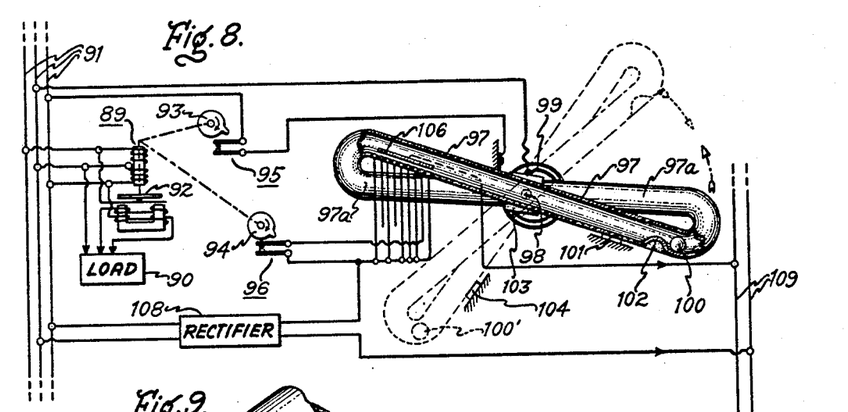
FIGURE 8 is a schematic view of an improved coding meter installation in which a rolling mercury globule develops a distinctive series of coding pulses.
Figures 9, 10:
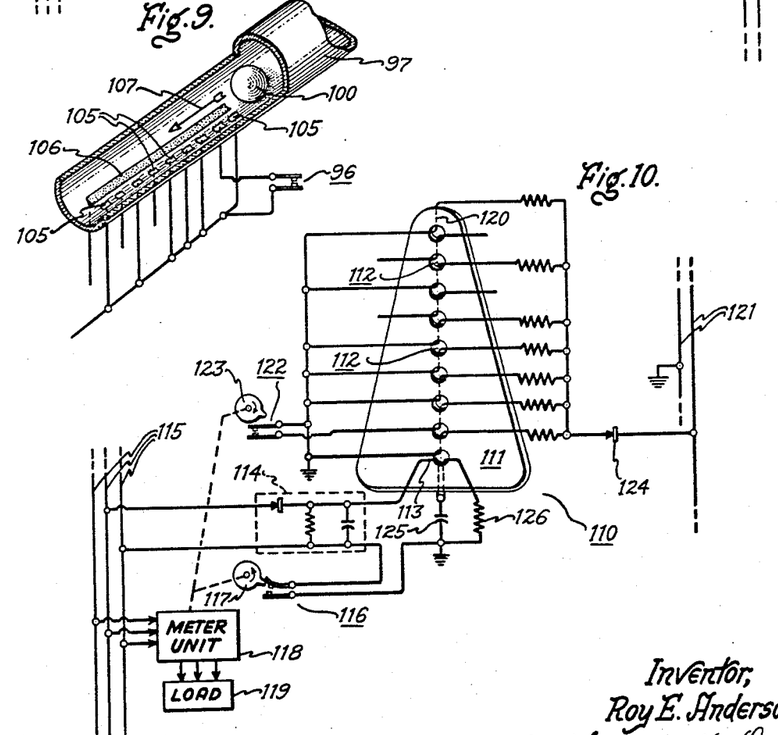
FIGURE 9 portrays a fragment of the coding tube assembly of the FIGURE 8 meter installation.
FIGURE 10 is a partly schematic and partly block-diagrammed representation of a meter installation in which a ferrite delay line unit develops a high-speed coded pulse train directly, without assistance from a high-speed repeater.

A preferred meter encoding technique is practiced by the meter installation represented in FIGURE 8, this type of installation also being suitable for use as the meter installations in the systems of FIGURE 1 or 6. Induction meter motor unit 89 there serves a consumer load 90 from service mains 91, and its conductive disk 92 rotates both the 200 watthour cam 93 and 2 kwh. cam 94 so that their respective normally-open switches 95 and 96 are closed each time another 200-watthour and 2-kilowatthour increment of power is absorbed by the load. Pulse generation and encoding is achieved by an encoder in the form of a hollow insulating tube 97 which is pivoted to rotate about a horizontal shaft axis 98 in response to torques exerted by a bimetal thermal motor 99. This tube contains a small globule or ball of mercury, 100, which in the illustrated orientation of tube 97 against one of its stops 101 is lodged at the lowermost end, behind a slight constriction 102. However, closure of the switch 95 of 200-watthour cam 93 applies heating current through the spiral bimetal thermal motor 99 from mains 91, causing it to turn the mounting block 103 and tube 97 counterclockwise to the position illustrated in dashed linework where the stop 104 is encountered, whereupon the mercury ball 100 is impelled to the opposite end of tube 97 by gravity. The latter stopped orientation is portrayed by the dashed linework 100'. In the course of this movement, conductive mercury ball 100 rolls across an axially-distributed row of nine small contacts 105 and an adjacent elongated contact 106, electrically connecting each of contacts 105 with contact 106, sequentially. Preferably, the contacts 105 are spaced, and the mercury ball 100 is suitably proportioned, so that each of the contacts 105 makes and breaks its electrical connection with contact 106 in timed sequence independently of the others, with about a 50% duty cycle of connect and disconnect conditions prevailing. The fragmentary illustration in FIGURE 9 depicts the tube 97 as a glass tube, with the conductive contact surfaces cylindrically contoured to match the interior contour of the tube and to offer least resistance to downwardly-inclined movement of the ball in the direction of arrow 107. Certain of the nine aligned contacts, or electrodes, 105 are connected together and to one of the output terminals of a rectifier source 108, according to the binary coding which is to identify that particular meter installation. For the purpose of developing the specific pulse coding illustrated in FIGURE 4, the first, third, fourth, fifth, seventh and ninth of contacts 105, viewed from right to left in FIGURES 8 and 9, are permanently connected together, with the second connected only when the 2 kwh. switch 96 is closed. The remaining contacts in the row of nine are left unconnected. Elongated contact 106 is connected with one of the section output lines 109 and the other terminal of source 108 with the other, such that the successive rapid electrical connections between contacts 105 and 106 are effective to apply the desired coded pulses to this line. Angular movements of tube 97 are limited, such that flexible lead connections may be brought between relatively movable parts in a known manner, although in the interest of simplification these are not detailed in the drawings. The function of thermal torque motor 99 may be performed by other known devices, and, in one simple alternative construction the conductive disk 92 is instead connected to drive a cam which mechanically tilts the tube against the slight return force of a restraining spring. In any event, either such a restraining spring, or the cooling bimetal motor, returns the tilted tube to the illustrated full-line position to ready it for the next-succeeding encoding. The output circuitry may be automatically disconnected during the return tilting to prevent a reversed train of pulses from being delivered then; however, the need for such a disconnect operation is preferably avoided by shaping the tube 97 in the illustrated figure-eight or doubled back form. The doubled back portion 97a provides a separate return path for the mercury ball to travel to the lodged position shown in FIGURE 8, and it must pursue this path to the exclusion of the other because of the illustrated tube twisting which causes gravity to lead it as intended.

High-speed repetition of the meter installation pulse coding is important where the encoder mechanism does not develop its pulse train within a sufficiently short interval to suppress adequately the statistical probability of overlap with messages from other like installations. However, inherently high-speed encoders obviate the need for high-speed repetition, such that the repeater equipment can simply be triggered to append its five-bit section code pulses to any message which is issued within its section. A meter installation which operates in this fashion appears in FIGURE 10, where the high-speed encoder 110 in the signalling stage includes a small multi-apertured ferrite core member 111 in which the state of core magnetization at each of the nine apertures 112 is changed progressively in sequence from near the base to the top of the tapered ferrite line member 111 as current is first passed through a primary control winding 113 looped through the lowest aperture. This current is applied from a rectifier 114 energized by the service mains 115, through a normally-open switch 116 closed by the 200-watthour cam 117, the latter being actuated by the meter motor unit 118 serving consumer load 119.

A sequence of pulses, one for each of the nine windings 120 on the delay line, is developed at high speed, the delay between successive pulses being of the order of but ten microseconds, for example. The identification code which is produced depends upon what connections are made to place the output windings 120 across the section output line 121. Lowermost winding 120 develops the start pulse; the next higher winding develops the 2 kwh. check pulse when the associated normally-open switch 122 is closed by the 2 kwh. cam 123 driven by the meter unit 118; the next three higher windings develop three successive code pulses; the next winding is unconnected and produces no pulse across the section lines; the next winding yields a coding pulse; the next is unconnected and applies no output pulse; and the topmost winding delivers the final meter coding pulse. These connections therefore result in a meter identification coding as designated by numeral 54 in FIGURE 5. Rectifier 124 insures that only the intended positive pulses can reach the section output lines, this being a safeguard which is desirable because of other changes in core magnetization which result when the control winding is deenergized and re-setting takes place under influence of capacitor 125 and resistor 126. Section identification coding may also be generated by the encoder itself, in the described coding process, provided the tapered ferrite core is further extended and includes the needed further apertures and windings (five, in the case of the five-bit coding). Repeater equipment is then rendered entirely unnecessary in the system.

Economies which can be realized through use of a relatively slow-speed encoder device, such as that of FIGURES 8 and 9, are in part due to the lower frequency-bandwidth requirements of the message within each section, such that the section output communication link between the string of one hundred and twenty-eight or so meter installations need not carry inordinately high frequencies. This factor can be particularly important where the consumer loads are not close together, and the complexities of high-frequency transmission are more than offset even though a high-speed repeater and section encoder equipment must be added to serve each section of meter installations. Combined repeater and section encoder equipment has earlier been referred to in connection with the FIGURE 6 illustrations, and details of an advantageous combined equipment of this character are next described having reference to FIGURE 11. There, the meter installations 127 represent a group of up to one hundred and twenty-eight units, such as that of FIGURES 8 and 9, serving consumer loads and applying their relatively slow-speed coded pulse trains to the repeater over the section output communications link 129, the latter preferably comprising a simple two-wire line although it may alternatively assume other known forms. A first magnetic shift register, 130, has the nine-bit messages from the meter installations stored in it, for rapid read-out under control of a high-speed oscillator 131, while a second magnetic shift register, 132, has the distinctive five-bit section code stored in it for rapid read-out in appended relationship to the nine-bit message. As shown, these magnetic shift registers conveniently include small annular magnetic cores, equal in number to the number of bits of information they are to store, and each includes an input, output and control shift windings. Referring to the core register 130, for example, this includes the nine cores 133, the first of which receives the pulse-coded message in its input winding 134 and delivers each bit of the message to the input winding of the next stage from its output winding 135 in response to shift signals applied to its shift winding 136. The conventional series rectifier 137 and resistance 138 and shunt capacitor 139 are associated with the output winding 135 in the shift register. In the five-bit address coder shift register 132, the construction is similar, except that each of the five cores 140 which is to develop an output coding pulse possesses a further winding, 141, which is excited to shift the core saturation state for coding purposes, this being serially coupled with the like windings of those other cores in the series which are also to produce output coding pulses when the cores are read out.

Figure 11:
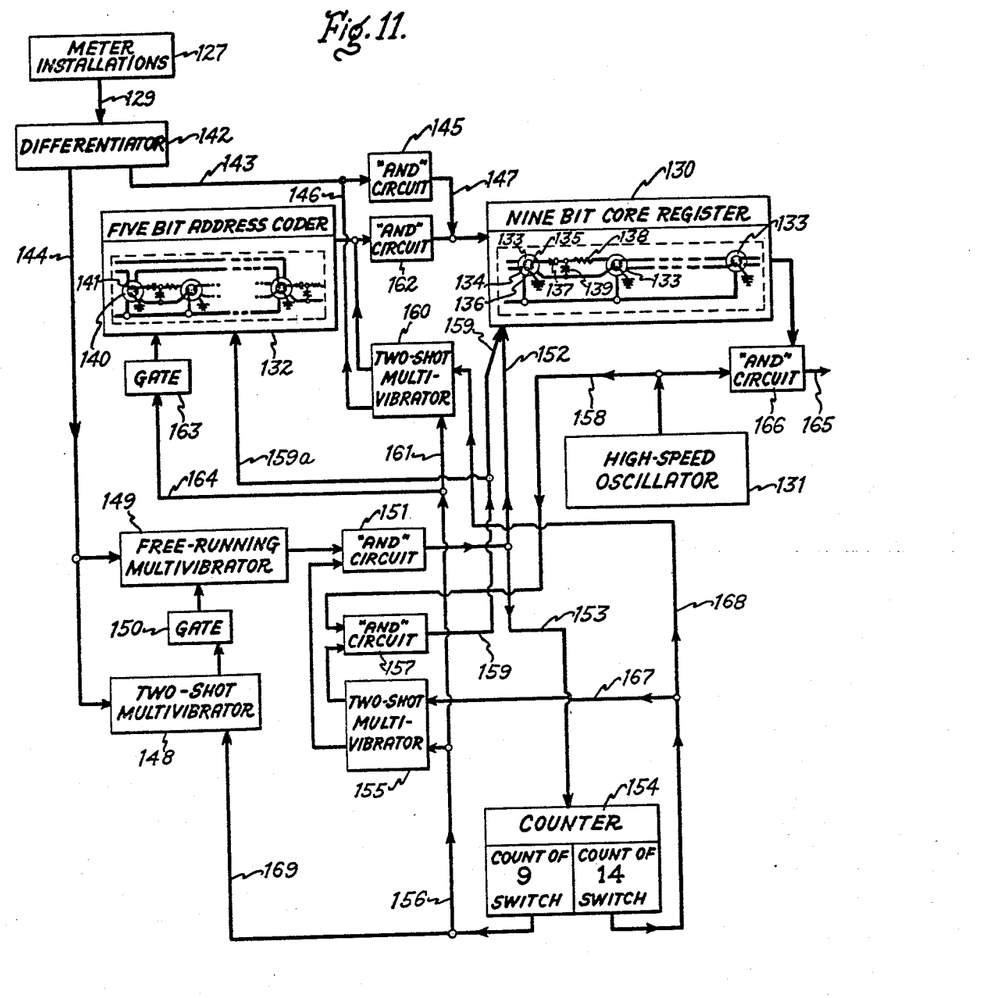
FIGURE 11 provides a block and schematic diagram of section repeater equipment which improves statistical accuracy of the improved meter reading system.

Any message arriving at the repeater from a meter installation is first applied to a differentiator 142 which derives from it an output of positive pulses in line 143 and an output of negative pulses in line 144. The positive pulses form a coded train duplicating the pattern of and intelligence in the incoming message, and these positive pulses are applied to an input of nine-bit register 130, such as the input winding 134, and are there stored temporarily, provided the intermediate "And" circuit 145, also receives signalling from its input line 146 that the positive pulse train is intended to be passed to the register through line 147. The negative pulses are applied over line 144 to both a two-shot multivibrator 148 and a free-running multivibrator 149, the former operating gate 150 to synchronize multivibrator 149 with the periodicity of the pulses in the incoming message. Through "And" circuit 151, output of the synchronized multivibrator 149 is applied both over line 152 to the nine-bit core register 130, where it provides the shift pulses needed to advance the incoming positive pulse signals into the core register, and over line 153, to the counter and electronic switch equipment 154. The count-of-nine switch section of equipment 154 then applies a pulse to a two-shot multivibrator 155 over line 156, after first counting nine pulses to permit the nine-bit coded message to enter shift register 130, which pulse actuates multivibrator 155 to cut off the output of the multivibrator 149 from the register 130 by interrupting "And" circuit 151. Multivibrator 155 also responds to the count-of-nine switch output pulse by setting a further "And" circuit 157 to pass the output of high speed oscillator 131 in line 158 to the shift register 130 along line 159 in lieu of the output from multivibrator 149. Simultaneously, the output of the high-speed oscillator 131 is passed along to the shift winding circuitry of five-bit address coder 132, over line 159a. And, simultaneously, the count-of-nine switch output pulse is applied to a further two-shot multivibrator 160, over line 161, to cause the output thereof to interrupt "And" circuit 145 and to cause "And" circuit 162 to connect the output of the five-bit encoder register 132 with the input of nine-bit register 130. The same count-of-nine switch pulse output is shown applied to a gate 163 over line 164, the gate applying a D.-C. impulse to the encoder input windings 141 for the purpose of setting up the proper section code in the encoder. The high-speed oscillator output is thus applied to the registers in the needed manner to advance the fourteen bits of information in the two registers out of the repeater equipment to a remote reading center by way of output line 165 through an "And" circuit 166 which responds to the outputs of oscillator 131 and register 130. At the end of the full fourteen-bit message interval, as determined by the count-of-fourteen switch section of counter 154, a re-set pulse is applied to two-shot multivibrators 155 and 160 over lines 167 and 168 to ready them for repeat operation; the same type of re-set of two-shot multivibrator 148 is achieved by application of the count-of-nine switch output to it over line 169. Accordingly, the high-speed oscillator empties each entire fourteen-bit pulse message to the reading center within a very short period and thereby materially reduces error probabilities in the system stages which follow.

Figure 12:
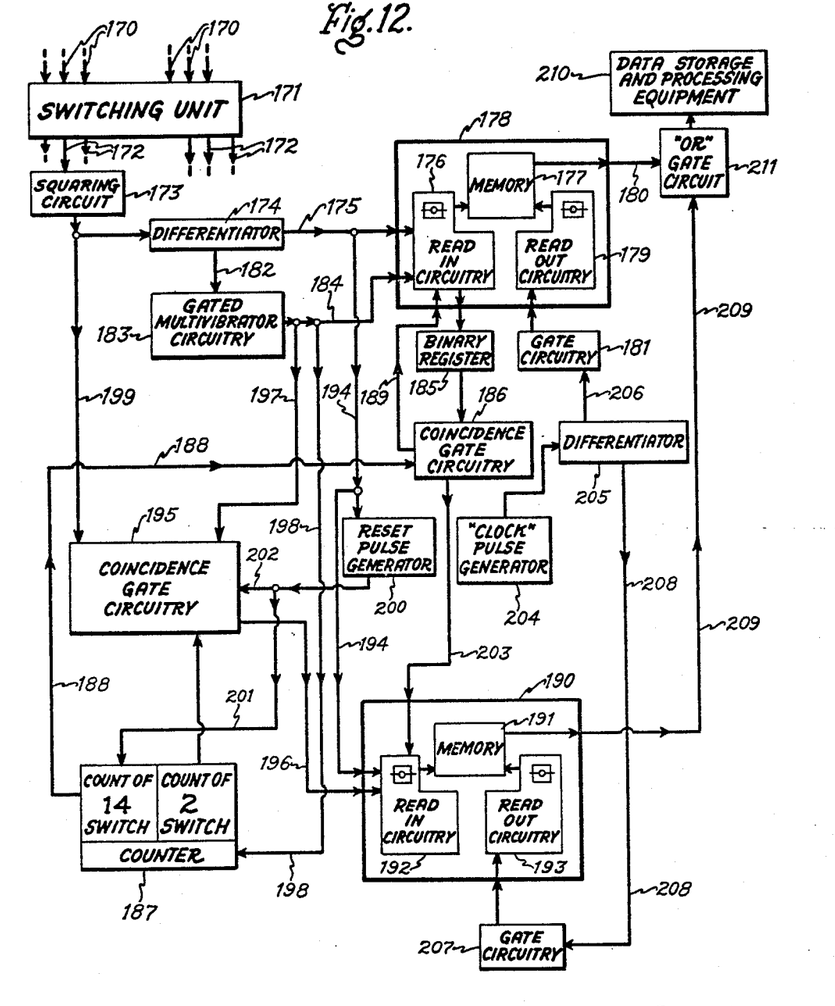
FIGURE 12 is a block diagram of random access memory equipment which provides storage and selective recovery of coded data from random-reporting meter installations in the improved meter reading system.

Random access memory equipment at the reading center of the incremental energy automatic meter reading system may assume the form illustrated in FIGURE 12, the block-diagrammed components of this equipment comprising apparatus which is well-known, as in the case of components in FIGURE 11, also. Sixteen of the random access memory equipments are used in a system having the fifteen section lines of thirty-two sections each, as described earlier herein, although only one is illustrated in FIGURE 12. According to these teachings, the number of random access memory equipments used is one more than the number of the section lines 170, such that no storage may be lost while any one of the equipments is disabled during the process of reading out to the data processing apparatus. The reading out is in accordance with a predetermined sequence, and is preferably performed during a one-second interval folowing fifteen seconds of storage. This timing schedule then permits but a single extra random access memory to overcome any loss of information due to read-out of the other (fifteen) memory equipments. For example, one of the sixteen memory equipments which has just stored for fifteen seconds is read out during the sixteenth second while another of the memory equipments which is cleared by having just been read out the second before is substituted for it, by switching, in its section line. This one of the equipments is cleared in the read-out process and is next substituted, by switching, for the next memory equipment completing its fifteenth second of storage, and so on. Mechanically-driven stepping switches fulfill this need, and these may comprise the switching unit 171. One of the sixteen output lines 172 (one more in number than the number of section lines 170 carrying input messages) from this switching unit is illustrated in its connection with a squaring circuit 173 which first insures that the leading and trailing edges of the coded pulses in any message are properly shaped. The output of this circuit is then applied to a differentiator 174 which delivers an output of positive pulses along line 175 to the read-in, or writing, circuitry 176 serving the memory 177 of the random access memory device 178. Memory 177 preferably comprises a known form of matrix or matrice including a number of tiny annular cores equal in number to the maximum number of meter installations served in any group of the thirty-two sections. These cores are each threaded by two read-in (and, alternatively, read-out) lines, as well as by one output line common to all of them, in the manner of the memory construction 42 shown in FIGURE 3. Read-in circuitry 176 decodes the incoming positive pulse trains and in each instance excites the proper one of the magnetic cores such that its magnetic state is shifted to signify that a particular meter installation has reported the consumption of the predetermined increment of energy. Decoders which fulfill this requirement are well known, and a diode decoder matrix fed by a binary shift register input circuit conveniently translates the positive pulse train message into the decoded signals applied to read-in wires threading the core of interest at any time. Read-out circuitry 179 may be of exactly the same character, although energized to empty the stored data in the cores into the core memory output signal line 180 in a predetermined sequence which identifies the appropriate meter installations. Gate circuitry 181 controls this read-out action, which preferably takes place in about one second, once the core memory has stored for a total of fifteen seconds.

Negative pulse output from the differentiator 174 appears in line 182 for application to the gated multivibrator circuitry 183 which is turned on by the first such negative pulse and which is held synchronized with the periodicity of the message pulses by the succeeding pulses in the train. Output pulses from this multivibrator in line 184 are applied to the read-in circuitry 176 where they serve as the shift pulses required to advance the positive pulses into the shift register part of read-in circuitry 176 which feeds the diode decoder matrix part of that circuitry. As has been explained hereinbefore, the coded message which identifies the meter installation and its section is preferably made up of seven-bit and five-bit parts, for a total of twelve bits, while the start pulse and 2 kwh pulses comprise added information used for other purposes. The twelve-bit coding is therefore the only message to be stored in the binary shift register part of read-in circuitry 176, and for this reason only twelve shift register stages appear there. A thirteenth, 185, is added separately, in series with the others although not being associated with the diode decoder matrix. The total of thirteen bits which can be stored in these binary shift registers is one less than the fourteen-bit total message, such that the fourteenth pulse from multivibrator circuitry 183 is effective to shift the first, start, pulse out of the register 185 and into coincidence gate circuitry 186. If the latter circuitry simultaneously receives an impulse from the count-of-fourteen section of a counter 187, over line 188, it applies the needed D.-C. signal to the decoder matrix of read-in circuitry 176 over line 189 to cause the twelve-bit code to be stored in core memory 177 in terms of a changed state of magnetization of a predetermined one of the memory cores.

The presence of a second pulse in the message train of pulses signifies the use of a tenth successive increment of energy by a load being metered. Accordingly, when this pulse is encountered, a memorizing of the fact that a particular meter installation has reported a tenth increment is to be performed. A second, or "decade," random access memory equipment 190, which is generally the same as random access memory 178, is used for the latter purpose. It likewise includes a memory 191, read-in circuitry 192, and read-out circuitry 193. The coded message, in terms of the positive pulse train output of differentiator 174, is applied to read-in circuitry 192 over line 194, but it is stored in the twelve binary register parts thereof only if the coincidence gate circuitry 195 applies an output to it over line 196. Circuitry 195 detects whether or not the 2 kwh. or "tens" pulse is present and, if so, operates to pass the shift pulse output of multivibrator circuitry 183 over line 197 to the line 196 feeding read-in circuitry 192. The needed detection is made by comparing the output of the count-of-two portion of counter 187 (which counter is also excited by the multivibrator circuitry 183, over line 198) with the pulse, if any, simultaneously appearing in response to signals in the output line 199 of the squaring circuit 173. Reset pulse generator 200 responds to the first differentiated positive pulse formed from the start pulse to trigger the counter 187 and gate 195 into a starting condition, by way of lines 201 and 202, respectively. Output of coincidence gate circuitry 186 over line 203 causes the twelve-bit information stored in the binary shift register portion of the "decade" memory read-in circuitry 192 to be written into the core memory 191.

The read-out circuitry of both memory equipments, circuitry 179 and 193, preferably includes a diode decoder matrix, as in the case of the read-in circuitry, but fed from known form of binary counter apparatus. The counters respond to pulses from a "clock" pulse generator 204, each successive pulse output of which then causes another core of the memory to be read out, in predetermined sequence. The outputs of the two memory equipments, are distinguished by having them displaced distinctively in phase. Conveniently, this is achieved by differentiating the equal-width equally-spaced pulse train output of generator 204, in differentiator 205, and by applying the positive differentiated pulses to the gate 181 of read-out circuitry 179 over line 206 while applying the delayed negative pulses to gate 207 of read-out circuitry 193 over line 208. Cores which correspond to the same meter installation in the two memory equipments 178 and 190 are caused to deliver outputs in lines 180 and 209 in immediate sequence, if the "tens," or 2 kwh. pulse is present. This is recognized, and used for purposes already referred to herein, in the balance of the data storage and processing equipment, 210, to which the memory outputs are fed through "Or" gate circuitry 211. Accordingly, the metered information is stored in the critical intervals, and has a suppressed error content.

It should be understood that the embodiments of this invention described herein are intended to be of a descriptive rather than a limiting character, and that various changes, combinations, substitutions or modifications may be practiced in accordance with these teachings without departing either in spirit or scope from this invention in its broader aspects.

What I claim as new and desire to secure by Letters Patent of the United States is:

1. Automatic metering apparatus comprising a plurality of meter installations each including a different meter unit having an output member the movements of which are related to the supply of a different consumer load by service mains and having a predetermined maximum capacity for measuring the rate of supply to the load, whereby only one predetermined amount of the supply which represents an acceptable resolution in measurement of the supply to the load can be measured through each said meter unit within a predetermined period, different electrical signalling means in each of said meter installations forming a part thereof and each producing distinctively-coded electrical signals distinctively identifying the meter installation of which it is a part responsive to successive movements of the output member thereof which are each related to the passage of said predetermined amount of supply to the load, data storage means remote from said meter installations, and a communication link applying said distinctively-coded electrical signals from said meter installations to said data storage means when they occur at the random times when any of said meter installations has passed another successive predetermined amount of supply to its load, said data storage means including means responsive to the occurrence and coding of said signals storing data characterizing the receipt thereof from the corresponding meter installations which produced them during each successive one of said predetermined periods.

2. Automatic metering apparatus comprising a plurality of meter installations each including an integrating meter unit having a predetermined maximum capacity for measuring the rate of supply to a consumer load therethrough from service mains, whereby only one predetermined amount of the supply which represents an acceptable resolution in measurement of the supply to the load can be measured through said meter unit within a predetermined period, different electrical signalling means forming a part of each of said meter installation and each controlled by the meter unit thereof to develop an output of coded electrical signals distinctively identifying the meter installation of which it is a part responsive to each successive passage of said predetermined amount of supply to its load, random access memory means remote from said meter installations, and a communication link applying said distinctively-coded electrical signals to said random access memory means when they occur at the random times when any of said meter installations has passed another successive predetermined amount of supply to its load, said random access memory means including memory means for storing data, means responsive to the occurrence and coding of said signals storing data in said memory means characterizing the receipt thereof from the corresponding meter installations which produced them, and means reading out and storing said data in sequence according to meter installations at the end of storage in said memory means for each successive one of said predetermined periods.

3. Automatic metering apparatus as set forth in claim 2 wherein said memory means comprises at least two memory devices of equal storage capacity, and further comprising means for switching the application of said signals from said communication link from one of said memory devices to another at the end of storage therein for said predetermined period and while the said one of said devices is being read out.

4. Automatic metering apparatus comprising a plurality of metering installations each including an integrating meter unit having a predetermined maximum capacity for measuring the rate of supply to a consumer load therethrough from service mains, whereby only one predetermined amount of the supply which represents an acceptable resolution in measurement of the supply to the load can be measured through said meter unit within a predetermined period, different electrical signalling means forming a part of each of said meter installations and each controlled by the meter unit thereof to develop an output of coded electrical signals distinctively identifying the meter installation of which it is a part responsive to each successive passage of said predetermined amount of supply to its load, a plurality of random access memory equipments remote from said meter installations, and a communication link for applying said distinctively-coded electrical signals to at least one of said random access memory equipments when they occur at the random times when any of said meter installations has passed another successive predetermined amount of supply to its load, said random access memory equipments each including memory means for storing data, means responsive to the occurrence and coding of said signals storing data in said memory means characterizing the receipt thereof from the corresponding meter installations which produced them, and output means destructively reading out and storing said data in sequence according to meter installations at the end of storage in said memory means for an interval equal to said predetermined period, and means switching application of said signals from said communication link to one of said random access memory equipments for one said interval and to another random access memory equipment for the next interval, said output means reading out said data in an interval less than said predetermined period.

5. Automatic metering apparatus comprising a plurality of meter installations each including an integrating meter unit having a predetermined maximum capacity for measuring the rate of supply to a consumer load therethrough from service mains, whereby only one predetermined amount of the supply which represents an acceptable resolution in measurement of the supply to the load can be measured through said meter unit within a predetermined period, different electrical signalling means forming a part of each of said meter installations and each controlled by the meter unit thereof to develop an electrical pulse train output having a binary coding distinctively identifying the meter installation of which it is a part responsive to each successive passage of said predetermined amount of supply to its load, random access memory means remote from said meter installations, and a communication link applying the coded pulse train outputs of said meter installations to said random memory means when they occur at the random times when any of said meter installations has passed another successive predetermined amount of supply to its load, said random access memory means including memory means for storing data, decoder means responsive to the occurrence and coding of said pulse train outputs writing data in said memory means in binary form characterizing the receipt thereof from the corresponding meter installations which produced them, and means reading out and storing said data in sequence according to meter installations at the end of storage in said memory means for each successive one of said predetermined periods.

6. Automatic metering apparatus comprising a group of up to a predetermined number of meter installations each including an integrating meter unit having a predetermined maximum capacity for measuring the rate of supply to a consumer load therethrough from service mains, whereby only one predetermined amount of the supply which represents an acceptable resolution in measurement of the supply to the load can be measured through said meter unit within a predetermined period, different electrical signalling means forming a part of each of said meter installations and each controlled by the meter unit thereof to develop an electrical pulse train output within a predetermined interval which is short in relation to said period and in which the presence and absence of pulses at predetermined times constitute bits of a binary coding distinctively identifying the meter installation of which it is a part responsive to each successive passage of said predetermined amount of supply to its load, said predetermined number of installations being not in excess of two to the power of the number of bits in said coding, random access memory means remote from said meter installations, and a communication link applying the coded pulse train outputs of said meter installations to said random access memory means when they occur at the random times when any of said meter installations has passed another successive predetermined amount of supply to its load, said random access memory means including memory means for storing data, decoder means responsive to the occurrence and coding of said pulse train outputs writing data in said memory means in binary form characterizing the receipt thereof from the corresponding meter installations which produced them, and means reading out and storing said data in sequence according to meter installations at the end of storage in said memory means for each successive one of said predetermined periods.

7. Automatic metering apparatus as set forth in claim 6 comprising a predetermined number of groups of said meter installations each corresponding to said group and in which the binary codings of the pulse train outputs of the signalling means in the different groups are the same, and wherein said communication link applies the pulse train outputs from all of said groups to said random access memory means, and further comprising separate coding means in the communication link between each of said groups and said random access memory means, and means connecting each of said coding means to produce in said link an electrical pulse train output responsive to and immediately following each occurrence of an electrical pulse train output from any meter installation in the same group, the pulse train outputs of each of said coding means occurring within a predetermined interval which is short in relation to said period and having a distinctive binary coding identifying its group in which the presence and absence of pulses at predetermined times constitute bits of said coding thereof, said predetermined number of groups being not in excess of two to the power of the number of bits in the coding of output of each of said coding means.

8. Apparatus as set forth in claim 6 further comprising electrical repeater means in said communication link temporarily storing the electrical pulse train outputs from the signalling means in said meter installations and immediately reproducing and repeating said pulse train outputs into said communication link within an interval which is shorter than said predetermined interval.

9. Apparatus as set forth in claim 7, further comprising different electrical repeater means in the communication link between each of said groups and said random access memory means, each of said electrical repeater means temporarily storing the electrical pulse train outputs from the signalling means in the meter installations in its group and immediately reproducing and repeating said pulse train outputs into said communication link at a higher pulse repetition rate than that of the pulses in the outputs of said signalling means, and wherein each of said coding means produces its electrical pulse train outputs at said higher repetition rate.

10. Automatic metering apparatus comprising a group of up to a predetermined number of electric meter installations each including an integrating electrical induction watthour meter unit having a predetermined maximum capacity for measuring the rate of supply of power to a consumer load therethrough from electric service mains, whereby only one predetermined amount of the supply which represents an acceptable resolution in measurement of the supply to the load can be measured through said meter unit within a predetermined period, different electrical signalling means forming a part of each of said meter installations and each controlled by the meter unit thereof to develop an electrical pulse train output within a predetermined interval which is short in relation to said period and distinctively identifying the meter installation of which it is a part responsive to each successive passage of said predetermined amount of supply to its load, said pulse train output including a first pulse for controlling operation of electrical equipment followed by a coding in which the presence and absence of pulses at predetermined times constitute bits of a binary coding distinctively identifying the meter installation in which it originates, different means operated by each of said meter units controlling the signalling means thereof to produce a further pulse in the output thereof only each successive time said meter unit measures a predetermined number of said predetermined amounts of supply to its load, random access memory means remote from said meter installations, and a communication link applying the coded pulse train outputs of said meter installations to said random access memory means when they occur at the random times when any of said meter installations has passed another successive predetermined amount of supply to its load, said random access memory means including memory means for storing data, decoder means responsive to the occurrence and coding of said pulse train outputs writing data in said memory means in binary form characterizing the receipt thereof from the corresponding meter installations which produced them, and means reading out and storing said data in sequence according to meter installations at the end of storage in said memory means for each successive one of said predetermined periods, and auxiliary memory means for storing data in said random access memory, decoder means responsive to each occurrence of a pulse train output including said further pulse and responsive to the binary coding of each said pulse train output including said further pulse writing data in said auxiliary memory means characterizing the receipt thereof from the corresponding meter installation which produced it, and means reading out and distinctively storing said data stored in said auxiliary memory means in sequency according to meter installations at the end of storage in said auxiliary means for each successive one of said predetermined periods.

11. Automatic metering apparatus as set forth in claim 10 wherein each of said meter units includes a disk rotated at an angular velocity proportional to the instantaneous watts of energy flowing to its load, wherein said meter unit includes a pair of electrical switches actuated between opening and closure by said disk, means connecting said disk to actuate one of said switches each time the load absorbs said predetermined amount of supply and to actuate the other of said switches each time the load absorbs said predetermined number of said predetermined amount of said supply, and means connecting said one and other of said switches in each installation to control said signalling means to produce said pulse train output and said further pulse, respectively.

12. Automatic metering apparatus as set forth in claim 11 wherein said predetermined amount of supply is about 200 watthours, wherein said predetermined number is ten, and wherein said predetermined period is about fifteen seconds.

13. Automatic metering apparatus comprising a meter unit having an output member the movements of which are related to the supply of a consumer load by service mains, said meter unit having a predetermined maximum capacity for measurement of the rate of supply to the load, whereby only one predetermined amount of the supply which represents an acceptable resolution in measurement of the supply to the load can be measured through said meter unit within a predetermined period, electrical signalling means for producing an output of electrical signals coded to identify said meter unit, and means actuating said signalling means to produce said output of signals responsive to successive movements of said output member which are related to the passage of said predetermined amount of supply to the load, each said output of signals being of short duration in relation to said predetermined period.

14. Automatic metering apparatus comprising an integrating meter unit having a predetermined maximum capacity for measurement of the rate of the supply to a consumer load therethrough from service mains, whereby only one predetermined amount of supply which represents an acceptable resolution in measurement of the supply to the load can be measured through said meter unit within a predetermined period, electrical signalling means for producing an output of electrical signals coded to identify said meter unit, and means responsive to measurements of said meter unit actuating said signalling means to produce said output of signals each successive time said meter unit measures the passage of said predetermined amount of supply to the load, each said output of signals being of short duration in relation to said predetermined period.

15. Automatic metering apparatus comprising an integrating electric induction watthour meter motor unit having a predetermined maximum capacity for measurement of the rate of the supply to a consumer load therethrough from electric service mains, whereby only one predetermined amount of the supply which represents an acceptable resolution in measurement of the supply to the load can be measured thruogh said meter motor unit within a predetermined period, electrical signalling means for producing an electrical pulse train output having a binary coding distinctively identifying said output from among a possible number of like trains from other meter motor units, means for energizing said signalling means from said service mains, and means actuating said signalling means to produce said pulse train output responsive to successive integrations of said predetermined amount of supply to the load by said meter motor unit, each said pulse train output being of short duration in relation to said predetermined period.

16. Automatic metering apparatus comprising an integrating electric induction watthour meter motor unit having a predetermined maximum capacity for measurement of the rate of the supply to a consumer load therethrough from electric service mains, whereby only one predetermined amount of the supply which represents an acceptable resolution in measurement of the supply to the load can be measured through said meter motor unit within a predetermined period, electrical encoder means for producing an electrical pulse train output distinctively identifying said meter unit, said encoder producing said output within a predetermined interval which is short in relation to said period and during which the presence and absence of pulses at predetermined times constitute bits of a binary coding, the number of said bits being at least equal to that which is the power to which two must be raised to equal the number of the other meter motor units from among which said meter motor unit is to be distinctively identified, means for electrically energizing said encoder means from said electric service mains and means actuating said encoder means to produce said pulse train output responsive to successive integrations of said predetermined amount of supply to the load by said meter motor unit, and means for applying the output of said encoder means to a communication link.

17. Automatic metering apparatus as set forth in claim 16 wherein said encoder means produces in said pulse train output a first pulse followed by said binary coding, and further comprising means operated by said meter motor unit actuating said encoder to produce a further pulse in the said output thereof only each successive time said meter motor unit integrates a predetermined number of said predetermined amounts of said supply to the load.

18. Automatic metering apparatus as set forth in claim 16 wherein said meter motor unit includes a disk rotated at an angular velocity proportional to the instantaneous watts of energy flowing to the load, wherein said meter motor unit includes an electrical switch actuated between opening and closure by said disk, means connecting said disk to actuate said switch each time the load absorbs said predetermined amount of supply, and wherein said encoder means comprises electrical switching means having a plurality of normally de-energized circuits energized in sequence upon actuation of said encoder, means connecting said switch to actuate said encoder, and means connecting predetermined ones of said normally de-energized circuits with said output applying means to establish said binary coding of said pulse train output.

19. Automatic metering apparatus as set forth in claim 16 wherein said encoder means comprises a closed tubular insulating member having a plurality of insulated electrical sets of contacts along the interior thereof in an axially-distributed relationship, a ball of mercury within said tubular member, torque motor means normally urging said tubular member to a tilted position in which said mercury ball is displaced from said contacts, an electrical switch in said meter motor unit actuated each time the load absorbs said predetermined amount of supply, means connecting said meter motor unit switch to actuate said torque motor means to tilt said tubular member from said position to another position in which gravity impels said mercury axially along said tubular member in successive shorting relationship to said axially distributed sets of contacts, and means connecting predetermined ones of said sets of contacts with said output applying means in series with the output of said means energizing said encoder from said service mains to establish said binary coding.

20. Automatic metering apparatus as set forth in claim 19 wherein said predetermined amount of supply is about 200 watthours, and wherein said predetermined period is about fifteen seconds.

References Cited in the file of this patent

UNITED STATES PATENTS

| | | |
|---|---|---|
| 2,389,275 | Rayner | Nov. 20, 1945 |
| 2,671,211 | Black | Mar. 2, 1954 |
| 2,749,535 | Cruess | June 5, 1956 |

FOREIGN PATENTS

| | | |
|---|---|---|
| 970,248 | Germany | Aug. 20, 1958 |

UNITED STATES PATENT OFFICE
CERTIFICATE OF CORRECTION

Patent No. 3,114,900                  December 17, 1963

Roy E. Anderson

It is hereby certified that error appears in the above numbered patent requiring correction and that the said Letters Patent should read as corrected below.

Column 10, line 69, after "ferrite" insert -- delay --.

Signed and sealed this 2nd day of June 1964.

(SEAL)
Attest:

ERNEST W. SWIDER
Attesting Officer

EDWARD J. BRENNER
Commissioner of Patents